US012218414B2

(12) United States Patent
Sato et al.

(10) Patent No.: US 12,218,414 B2
(45) Date of Patent: Feb. 4, 2025

(54) LOW-PROFILE COMPOSITE ANTENNA DEVICE

(71) Applicant: HARADA INDUSTRY CO., LTD., Tokyo (JP)

(72) Inventors: Masato Sato, Tokyo (JP); Hironobu Hashimoto, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/718,726

(22) PCT Filed: Dec. 12, 2022

(86) PCT No.: PCT/JP2022/045749
§ 371 (c)(1),
(2) Date: Jun. 11, 2024

(87) PCT Pub. No.: WO2023/112903
PCT Pub. Date: Jun. 22, 2023

(65) Prior Publication Data

US 2024/0421469 A1 Dec. 19, 2024

(30) Foreign Application Priority Data

Dec. 13, 2021 (JP) ................................ 2021-201565

(51) Int. Cl.
*H01Q 1/32* (2006.01)
*H01Q 1/36* (2006.01)
(Continued)

(52) U.S. Cl.
CPC ............ *H01Q 1/3275* (2013.01); *H01Q 1/36* (2013.01); *H01Q 1/42* (2013.01); *H01Q 5/307* (2015.01); *H01Q 9/0414* (2013.01); *H01Q 9/16* (2013.01)

(58) Field of Classification Search
CPC .......... H01Q 1/3275; H01Q 1/36; H01Q 1/42; H01Q 5/307; H01Q 9/0414; H01Q 9/16
See application file for complete search history.

(56) References Cited

U.S. PATENT DOCUMENTS

2019/0027819 A1 1/2019 Terashita et al.
2020/0194882 A1* 6/2020 Kim .................... H01Q 1/3208
(Continued)

FOREIGN PATENT DOCUMENTS

JP 2019012960 A 1/2019
WO 2017/141635 A1 8/2017
(Continued)

OTHER PUBLICATIONS

International Search Report in PCT/JP2022/045749, dated Feb. 21, 2023.

*Primary Examiner* — Dieu Hien T Duong
(74) *Attorney, Agent, or Firm* — Global IP Counselors, LLP

(57) ABSTRACT

A low-profile composite antenna device for vehicles includes a base plate, a circuit board, an antenna cover, a first element and a second element. The antenna cover has a ridgeline part whose longitudinal direction faces the vehicle traveling direction and a side surface part extending from both sides of the ridgeline part. The first element is arranged at the left side in the vehicle traveling direction, is inclined with respect to the base plate as viewed from the front side in the vehicle traveling direction and the upper end side thereof is arranged in a vicinity of the ridgeline part. The second element is arranged at the right side in the vehicle traveling direction, the upper end side thereof is arranged in the vicinity of the ridgeline part with a gap, and faces the first element from the ridgeline part toward the base plate.

13 Claims, 4 Drawing Sheets

(51) Int. Cl.

| | |
|---|---|
| ***H01Q 1/42*** | (2006.01) |
| ***H01Q 5/307*** | (2015.01) |
| ***H01Q 9/04*** | (2006.01) |
| ***H01Q 9/16*** | (2006.01) |

(56) References Cited

U.S. PATENT DOCUMENTS

2022/0094044 A1* 3/2022 Yun ........................ H01Q 5/307
2023/0066694 A1 3/2023 Kowaita et al.

FOREIGN PATENT DOCUMENTS

WO 2018180627 A1 10/2018
WO 2021153179 A1 8/2021

* cited by examiner

LOW-PROFILE COMPOSITE ANTENNA DEVICE

CROSS-REFERENCE TO RELATED APPLICATIONS

This application is a U.S. national stage application of International Application No. PCT/JP2022/045749, filed on Dec. 12, 2022. This application claims priority to Japanese Patent Application No. 2021-201565, filed on Dec. 13, 2021.

BACKGROUND

Technical Field

The present invention relates to a low-profile composite antenna device, and more particularly to a low-profile composite antenna device for vehicles.

Background Information

Various types of antenna devices are available for vehicles these days. One example is an AM/FM radio antenna for receiving AM and FM broadcasts. The AM/FM radio antenna is typically a rod antenna. The rod antenna includes an element part in which an element (helical element) constituted by a helical conductor is covered with a cover member and a base plate for mounting the element part.

When the rod antenna is mounted onto a vehicle body, the element part significantly protrudes from the vehicle body. This may spoil the beauty and design of the vehicle and cause breakage during garaging or car washing. Further, the rod antenna is exposed from the vehicle body, so that the element part has a possibility of being stolen.

To cope with such problems, there is proposed a low-profile antenna device designed so as to make the entire device height lower than the height of the rod antenna, to house the element in an antenna case to prevent exposure thereof to the outside, and to form the antenna case into a FUKAHIRE shape (a shark fin shape) considering the design property of the entire vehicle mounted with the antenna device. Such a low-profile antenna device often has a height of 70 mm or less and a length in the longitudinal direction of about 200 mm in consideration of regulations.

However, the low-profile antenna device having a height as low as 70 mm or less may degrade radiation efficiency due to antenna conductor loss (reduction in element length), which may cause sensitivity degradation. Further, recently, various types of antennas, such as a TEL antenna, a GPS antenna, and a V2X antenna for vehicle-vehicle/road-vehicle communication need to be mounted on the vehicle as a composite antenna device. However, the internal space of low-profile antennas is narrow, so that it is difficult to ensure the distance between such various antennas, which may degrade antenna transmission/reception characteristics.

Under such circumstances, PCT International Publication No. 2017/141635 (hereinafter referred to as Patent Document 1) discloses an antenna device provided with first and second antennas. The second antenna has a plate-like shape and is arranged above the first antenna. The first antenna is arranged so as to avoid a voltage maximum point of a standing wave in the frequency band of the first antenna generated in the second antenna. This achieves miniaturization of the antenna device while preventing a reduction in antenna gain.

Further, Japanese Patent Application Kokai Publication No. 2019-012960 A (hereinafter referred to as Patent Document 2) discloses an antenna device having a DTTB element between capacity loaded elements arranged at the left and right thereof, and a trap circuit to trap an FM wave band is connected to a feeding part of the DTTB element. This achieves miniaturization of the antenna device in the front-rear direction thereof while preventing interference with the FM wave band.

SUMMARY

Further miniaturization of antenna devices is required, and there is recently a need for further bandwidth widening of, for example, a TEL antenna, which involves an increase in size of the TEL antenna. Under such circumstances, there is a demand to develop an antenna device capable of being housed in a narrow internal space while maintaining satisfactory antenna transmission/reception characteristics.

The present invention has been made in view of the above situation, and an object thereof is to provide a low-profile composite antenna capable of miniaturization while maintaining satisfactory antenna transmission/reception characteristics.

To achieve the above object of the present invention, a low-profile composite antenna device according to the present invention includes: a base plate fixed to a vehicle and whose longitudinal direction faces a vehicle traveling direction; a circuit board arranged on the base plate and having a feeding part for a first element and a feeding part for a second element; an antenna cover fitted to the base plate, having a ridgeline part whose longitudinal direction faces the vehicle traveling direction and a side surface part extending from both sides of the ridgeline part, and having a chevron cross sectional shape as viewed from a front side in the vehicle traveling direction; a first element like plate housed in the antenna cover, which is arranged at one of left and right sides in the vehicle traveling direction, which is inclined with respect to the base plate as viewed from the front side in the vehicle traveling direction, whose upper end side is arranged in a vicinity of the ridgeline part, and which is connected to the feeding part for the first element of the circuit board to function as an antenna for a first frequency band; and a second element like plate housed in the antenna cover, which is arranged at the other of the left and right sides in the vehicle traveling direction, whose upper end side is arranged in the vicinity of the ridgeline part with a gap from the first element, which faces the first element from the ridgeline part toward the base plate, and which is connected to the feeding part for the second element of the circuit board to function as an antenna for a second frequency band different from the first frequency band.

The first element and the second element may be arranged such that at least upper parts thereof are arranged in an inverted V shape as viewed from the front side in the vehicle traveling direction.

The first element and/or the second element may be arranged such that at least upper parts thereof are along the side surface part of the antenna cover.

The second element may be bent in an S-like shape as viewed from the front side in the vehicle traveling direction.

The first element and/or the second element may be bent such that the upper end sides thereof face with each other in the vicinity of the ridgeline part of the antenna cover.

The first element may be arranged so as to be inclined with respect to the base plate, and the second element is arranged vertically with respect to the base plate.

The second element may be arranged at a side close to a position where the base plate is fixed to the vehicle at one of front and rear sides in the vehicle traveling direction.

The second element may be constituted by a bow-tie antenna having a tapered shape tapered from the ridgeline part toward the feeding part for the second element.

The low-profile composite antenna device may further include a coil which is connected between the first element and the feeding part for the first element, and is adjusted so as to function as a resonance antenna for a third frequency band using a series circuit of the first element and the coil.

The first element may be arranged at one of the left and right sides in the vehicle traveling direction and also partially arranged at the other of the left and right sides in the vehicle traveling direction.

A part of the first element arranged at one of the left and right sides in the vehicle traveling direction and a part of the first element partially arranged at the other of the left and right sides in the vehicle traveling direction may be formed to be a chevron shape in a cross-sectional shape as viewed from the front side in the vehicle traveling direction by being integrated at the ridgeline part side.

The second element may be arranged at a position where the first element partially arranged at the other of the left and right sides in the vehicle traveling direction is absent.

The low-profile composite antenna device may further include a coil which is connected between the first element and the feeding part for the first element, and is adjusted so as to function as a resonance antenna for a third frequency band using a series circuit of the first element and the coil. The coil may be arranged below the first element which are formed to be a chevron shape in a cross-sectional shape as viewed from the front side in the vehicle traveling direction by being integrated at the ridgeline part side.

The low-profile composite antenna device according to the present invention is advantageous in being capable of miniaturization while maintaining satisfactory antenna transmission/reception characteristics.

BRIEF DESCRIPTION OF THE DRAWINGS

Referring now to the attached drawings which form a part of this original disclosure, illustrative embodiments are shown.

DETAILED DESCRIPTION OF EMBODIMENTS

Figure 1A:
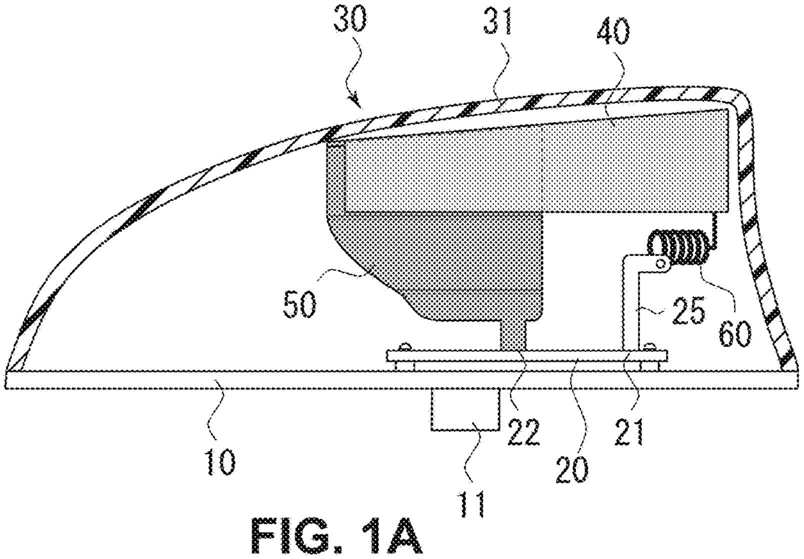
FIGS. 1A, 1B and 1C are schematic views for explaining a low-profile composite antenna device according to an illustrated embodiment.
Figure 1B:
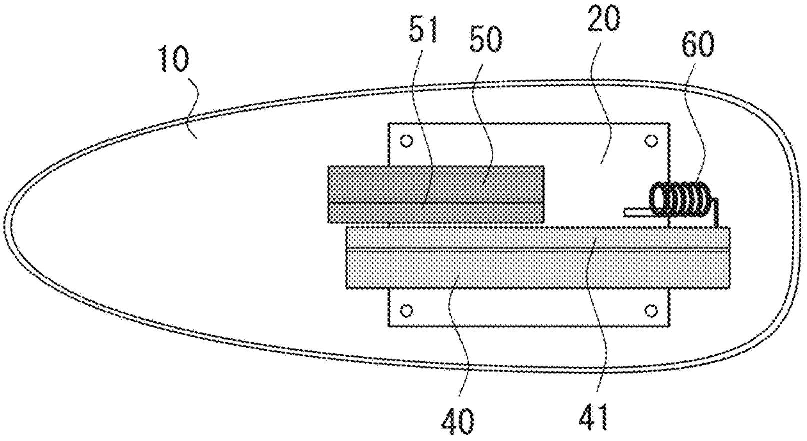
Figure 1C:
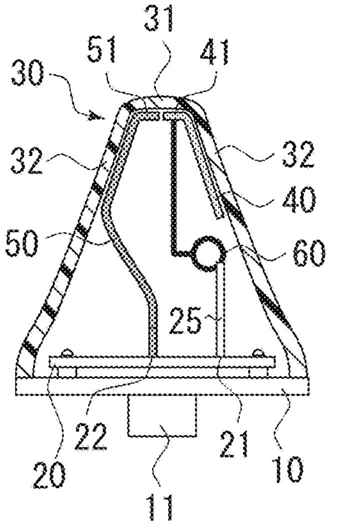

Hereinafter, an embodiment for practicing the present invention will be described with illustrated examples. FIGS. 1A to 1C are schematic views for explaining a low-profile composite antenna device according to the present invention. FIG. 1A is a side view, FIG. 1B is atop view, and FIG. 1C is a front view. FIGS. 1A to 1C are cross sections for explaining the inside of the low-profile composite antenna device. As illustrated, the low-profile composite antenna device according to the present invention includes a base plate 10, a circuit board 20, an antenna cover 30, a first element 40, and a second element 50. In the example illustrated in FIGS. 1A and 1B, the left side is a vehicle traveling direction.

The base plate 10 is fixed to a vehicle. The base plate 10 is arranged such that the longitudinal direction thereof faces the vehicle traveling direction. Specifically, the base plate 10 may be a so-called resin base formed of an insulator such as resin, or may be a so-called metal base formed of a conductor such as metal. Also, the base plate 10 may be a composite base of resin and metal. For example, a screw boss 11 is provided on the base plate 10. The screw boss 11 is inserted into a hole formed in a roof or the like of the vehicle, and a nut is fastened from a vehicle cabin side to fix the base plate 10 to the roof or the like so as to sandwich the roof or the like between the nut and the base plate 10. A power supply cable or a signal cable for connecting the vehicle interior and the antenna device is inserted through the screw boss 11. Further, the base plate 10 is configured to be covered with the antenna cover 30, the detail of which will be described later.

The circuit board 20 is arranged on the base plate 10 and has a feeding part 21 for a first element and a feeding part 22 for a second element. The circuit board 20 is provided with an amplifier circuit, a filter circuit, and the like as needed so as to be capable of signal transmission/reception. Although one circuit board 20 has the feeding part 21 for the first element and the feeding part 22 for the second element in the illustrated example, the present invention is not limited to this, but two circuit boards may respectively have the feeding parts 21 and 22.

The antenna cover 30 is fitted to the base plate 10. In the illustrated example, the antenna cover 30 defines the outer shape of the low-profile composite antenna device; however, the low-profile composite antenna device according to the present invention is not limited to this, but, for example, the antenna cover 30 may have an inner cover and an outer cover, i.e., a double cover structure. In this case, the inner cover houses thereinside the circuit board 20, and first and second elements 40 and 50 to be described later, and the outer cover defines the outer shape of the low-profile composite antenna device. As illustrated in FIG. 1C, the antenna cover 30 has a ridgeline part 31 whose longitudinal direction faces the vehicle traveling direction and a side surface part 32 extending from both sides of the ridgeline part 31 and has such a shape that the cross section assumes a chevron shape as viewed from the front side in the vehicle traveling direction.

The first element 40 is housed in the antenna cover 30. The first element 40 is a plate-like element connected to the feeding part 21 for the first element of the circuit board 20 to function as an antenna for a first frequency band. The first element 40 is arranged at one of the left and right sides as viewed from the front side in the vehicle traveling direction. Specifically, as illustrated in FIG. 1B, the first element 40 is arranged at the left side in the vehicle traveling direction.

Further, as illustrated in FIG. 1C, the first element 40 is arranged so as to be inclined with respect to the base plate 10 as viewed from the front side in the vehicle traveling direction. Specifically, in FIG. 1C, the first element 40 extends obliquely downward and outward from an upper end side 41. The upper end side 41 of the first element 40 is arranged in the vicinity of the ridgeline part 31.

The first element 40 may be a so-called capacity loaded antenna element. Specifically, the first frequency band may be an AM frequency band. In the AM frequency band, the first element 40 functions as a capacitive antenna. The first element 40, which is a capacity loaded antenna element as illustrated, may be arranged spaced apart from the base plate 10 in the height direction and connected to the feeding part 21 for the first element through a feed line 25. By disposing the thus configured first element 40 in an inclined manner, it is possible to increase antenna capacity. The longitudinal directions of the first element 40 faces the vehicle traveling direction. That is, the plate surface direction of the first element 40 faces the vehicle traveling direction. The first element 40 may be fixed onto the base plate by an insulating holder or the like as needed. Alternatively, the first element 40 may be fixed, without use of a holder or the like, to the inner surface of the antenna cover 30, for example.

The first element 40 may have an element length corresponding to the first frequency band. In this case, the first frequency band may be, e.g., a DTV frequency band. In the DTV frequency band, the first element 40 may function as a resonance antenna.

The second element 50 is also housed in the antenna cover 30. The second element 50 is a plate-like element connected to the feeding part 22 for the second element of the circuit board 20 to function as an antenna for a second frequency band different from the first frequency band. The second element 50 is arranged at the other one of the left and right sides in the vehicle traveling direction. Specifically, as illustrated in FIG. 1B, the second element 50 is arranged at the right side in the vehicle traveling direction. However, the present invention is not limited to this, but the first and second elements 40 and 50 may be arranged with the left and right sides reversed. Further, an upper end side 51 of the second element 50 is arranged in the vicinity of the ridgeline part 31 so as to be spaced from the first element 40. The second element 50 extends from the ridgeline part 31 to the base plate 10 so as to face the first element 40. That is, the longitudinal directions of the first and second elements 40 and 50 face the vehicle traveling direction, which also means that the plate surface direction of each of the first and second elements 40 and 50 faces the vehicle traveling direction. Thus, the surfaces of the first and second elements 40 and 50 need not necessarily be parallel. The second element 50 may be fixed onto the base plate by an insulating holder or the like as needed. Alternatively, the second element 50 may be fixed, without use of a holder or the like, to the inner surface of the antenna cover 30, for example.

Further, as illustrated in FIGS. 1A and 1B, the second element 50 is arranged shifted frontward in the vehicle traveling direction with respect to the first element 40; however, the present invention is not limited to this. The first and second elements 40 and 50 may be arranged with the front sides thereof aligned to each other, or the first element 40 may be arranged shifted frontward with respect to the second element 50.

The second element 50 may be, for example, a broadband antenna. Specifically, the second frequency band may be a TEL frequency band. In the example illustrated in FIG. 1C, the second element 50 is bent in an S-like shape as viewed from the front side in the vehicle traveling direction. Bending the second element 50 in this manner allows, in combination with the effect of the inclined arrangement of the first element 40, the second element 50 to extend in a direction separating from the first element 40 from its upper part to lower part, which can further increase the distance between the elements and can increase the element length of the second element 50. This allows the second element 50 to support up to a lower frequency band while reducing the influence of interference with the first element 40 even in a narrow space.

Here, the side surface shape of the second element 50 will be described more specifically. Referring back to FIG. TA, the second element 50 is constituted by a bow-tie antenna having a tapered shape tapered from the ridgeline part 31 toward the feeding part 22 for the second element. In this illustrated example, the front side thereof in the vehicle traveling direction is widened toward the upper part. This allows bandwidth widening. Further, the second element 50 has no corner and is outlined by curved lines, so that it is possible to prevent unintended resonance or the like.

Further, as illustrated in FIG. 1C, the upper parts of the first and second elements 40 and 50 are arranged in an inverted V shape as viewed from the front side in the vehicle traveling direction. Specifically, a part of the first element 40 that is arranged inclined with respect to the base plate 10 and a part of the second element 50 that faces the above part are arranged in an inverted V shape. The illustrated second element 50 is bent in an S-like shape, so that at least only the upper part thereof and the first element 40 are arranged in an inverted V shape. However, the shape of the second element 50 is not limited to such an S-like shape, but the second element 50 may extend vertically downward from the upper part arranged in an inverted V shape.

Further, as illustrated in FIG. 1C, at least the upper parts of the first and second elements 40 and 50 are arranged along the side surface part 32 of the antenna cover 30, thereby making it possible to make effective use of a narrow space while reducing the influence of interference between the first and second elements 40 and 50. The present invention is not limited to this, but only one of the first and second elements 40 and 50 may be arranged along the side surface part 32.

Focusing here on the vicinity of the ridgeline part 31 in FIG. 1C, in the first and second elements 40 and 50, the upper end sides 41 and 51 are bent so as to face each other in the vicinity of the ridgeline part 31 of the antenna cover 30. That is, the first and second elements 40 and 50 are capacitively coupled to each other at the upper end sides 41 and 51. By arranging the upper end sides 41 and 51 come close to and face each other in the vicinity of the ridgeline part 31, the second element 50 is influenced by the first element 40, as a result, it acts to make the element length of the second element 50 long. That is, since the element length for transmitting/receiving a desired TEL frequency band can be reduced, an element having a sufficient element length can be arranged even in a narrower space. The first element 40 is not influenced so much by the second element 50.

Further, in the illustrated example, a coil 60 is connected between the first element 40 and the feeding part 21 for the first element. The coil 60 is a series circuit formed by the first element 40 and coil 60 functions as a resonance antenna for a third frequency band. Specifically, the third frequency band may be an FM frequency band. For example, the inductor of the coil 60 is appropriately selected so as to allow the series circuit formed by the first element 40 and coil 60 to function as a resonance antenna in the FM frequency band.

As illustrated, the coil 60 is arranged such that the axial direction thereof is parallel to both the base plate 10 and the longitudinal direction of the first element 40. Thus, even when the length (the number of turns) of the coil 60 is changed depending on a vehicle type, only the length in the horizontal direction is changed, but the distance from the circuit board 20 will not be changed. Therefore, even when the length of the coil 60 is changed for adjustment, antenna reception characteristics will not change so much. The coil arrangement is not limited to this, but the coil 60 may be vertically arranged such that the axial direction thereof is parallel to a direction perpendicular to the longitudinal direction of the first element 40.

Further, as illustrated in FIG. 1B, the second element 50 is arranged facing the front side of the first element 40 in the vehicle traveling direction, and the coil 60 is arranged in a free space at the rear side of the second element 50 in the vehicle traveling direction. This arrangement allows effective use of a free space and reduces the influence that the coil 60 has on the second element 50. The coil 60 may be arranged at any position such as at the front, and center of the first element 40 in the vehicle traveling direction as long as the influence of the coil 60 to the second element 50 can be reduced.

In the low-profile composite antenna device according to the present invention, the first and second elements 40 and 50 can be separately arranged at the left and right sides in the vehicle traveling direction. This achieves miniaturization of the antenna device while maintaining satisfactory antenna transmission/reception characteristics.

Figure 2:
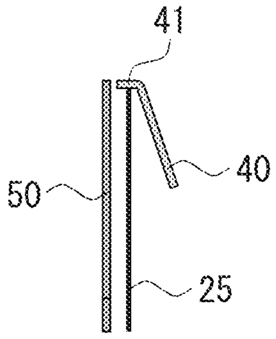
FIG. 2 is a schematic front view for explaining another example of the facing arrangement of the first and second elements of the low-profile composite antenna device according to the illustrated embodiment.

The arrangement of the first and second elements 40 and 50 as viewed from the front side in the vehicle traveling direction is not limited to that illustrated example. FIG. 2 is a schematic front view for explaining another example of the facing arrangement of the first and second elements of the low-profile composite antenna device according to the present invention. In the drawings, the same reference numerals as those in FIG. 1 denote the same parts. In the illustrated example, the first and second elements 40 and 50 are mainly illustrated, and other members are omitted. The first and second elements 40 and 50 may be fixed onto the base plate by an insulating holder or the like, as described above. Further, the first element 40 may be connected to the feeding part for the first element of the circuit board through the feed line 25. In the example illustrated in FIG. 1C, the upper parts of the first and second elements 40 and 50 are arranged in an inverted V shape. On the other hand, in the example illustrated in FIG. 2, the first element 40 is arranged so as to be inclined with respect to the base plate 10, while the second element 50 is arranged vertically with respect to the base plate 10. One of the elements, e.g., the second element 50 may be arranged vertically depending on a free space inside the antenna cover 30.

Even in this arrangement, the first element 40 is thus arranged inclined, thus allowing the second element 50 to extend in a direction separating from the first element 40 from its upper part to lower part, which can reduce the influence of interference between the first and second elements 40 and 50 depending on a free space inside the antenna cover 30. Contrary to the illustrated example, an arrangement is possible in which the first element 40 is vertically arranged with respect to the base plate, and the second element 50 is arranged inclined with respect to the base plate.

Figure 3:
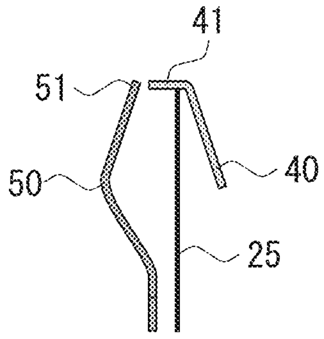
FIG. 3 is a schematic front view for explaining another example of the arrangement in the vicinity of the ridgeline part of the first and second elements of the low-profile composite antenna device according to the illustrated embodiment.

Further, in FIG. 1C, the upper end sides 41 and 51 of the first and second elements 40 and 50 are bent so as to face each other in the vicinity of the ridgeline part 31 of the antenna cover 30; however, the present invention is not limited to this. FIG. 3 is a schematic front view for explaining another example of the arrangement in the vicinity of the ridgeline part of the first and second elements of the low-profile composite antenna device according to the present invention. In the drawings, the same reference numerals as those in FIG. 1 denote the same parts. In the illustrated example, the first and second elements 40 and 50 are mainly illustrated, and other members are omitted. In the example illustrated in FIG. 3, the upper end side 41 of the first element 40 is bent to the second element 50 side, while the upper end side 51 of the second element 50 is not bent to the first element 40 side. The upper end side 41 of the first element 40 extends beyond the center of the left and right sides in the vehicle traveling direction toward the second element 50 side. As described above, only one of the upper end sides 41 and 51 of the respective first and second elements 40 and 50 may be bent. Although the upper end side 41 of the first element 40 is bent to extend toward the second element 50 side in the illustrated example, the present invention is not limited to this. For example, the upper end side 51 of the second element 50 may be bent to extend toward the first element 40 side with the upper end side 41 of the first element 40 not bent.

Figure 4A:
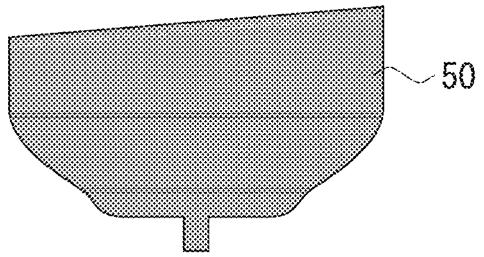
FIGS. 4A and 4B are schematic views for explaining another example of the side surface shape of the second element of the low-profile composite antenna device.
Figure 4B:
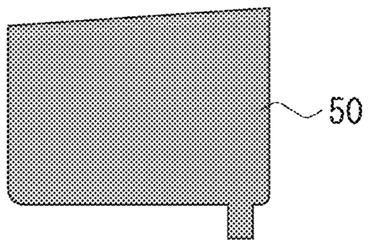

FIGS. 4A and 4B illustrate another example of the side surface shape of the second element 50. FIGS. 4A and 4B are schematic side views for explaining another example of the side surface shape of the second element of the low-profile composite antenna device according to the present invention, wherein FIG. 4A is another example, and FIG. 4B is still another example. In the drawings, the same reference numerals as those in FIG. 1 denote the same parts. The example illustrated in FIG. TA has the shape in which the front side in the vehicle traveling direction is widened toward the upper part, on the other hand, in the example illustrated in FIG. 4A, a bow-tie antenna is shown, which has a shape of both the front and rear sides in the vehicle traveling direction being widened toward the upper part. The second element 50 can be formed into various bow-tie shapes depending on a free space inside the antenna cover 30 in which the second element 50 is arranged or a desired frequency band.

Further, as illustrated in FIG. 4B, the second element of the low-profile composite antenna device according to the present invention may be formed into a simple rectangular shape. In the example of FIG. 4B, the second element 50 is arranged vertically with respect to the base plate as shown in FIG. 2. Also in this case, various element shapes are available depending on a desired frequency band or bandwidth.

Next, the arrangement of the first and second elements 40 and 50 will be described more specifically. Referring again to FIG. 1B, the second element 50 is arranged facing the front side of the first element 40 in the vehicle traveling direction. When the second element 50 functions as an antenna for a TEL frequency band, for example, it is preferably arranged on a stable ground due to the high frequency band. In a low-profile composite antenna device for vehicles, the base plate 10 is fixed to a vehicle roof using the screw boss 11. The position at which the base plate 10 is fixed to the vehicle roof serves as the most stable ground. Therefore, the second element 50 is preferably arranged at a side close to the fixed position of the base plate 10 of the front and rear sides in the vehicle traveling direction. In the example illustrated in FIG. 1B, the screw boss 11 is positioned at the front side of the first element 40 in the vehicle traveling direction, so that the second element 50 is arranged facing the front side of the first element 40 in the vehicle traveling direction.

Figure 5:
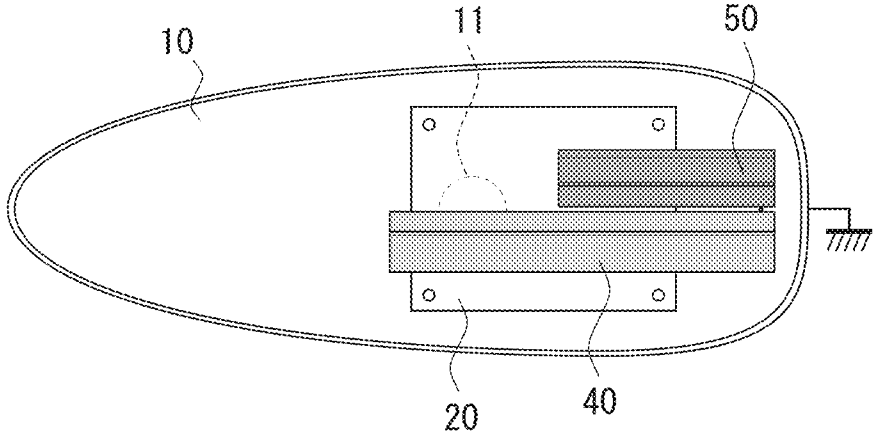
FIG. 5 is a schematic top view for explaining another example of the arrangement of the first and second elements of the low-profile composite antenna device according to another illustrated embodiment.

However, the present invention is not limited to this, but the first and second elements 40 and 50 may be arranged as illustrated in FIG. 5. FIG. 5 is a schematic top view for explaining another example of the arrangement of the first and second elements of the low-profile composite antenna device according to the present invention. In the drawings, the same reference numerals as those in FIG. 1 denote the same parts. In the example illustrated in FIG. 5, the rear side of the base plate 10 in the vehicle traveling direction is also grounded to the vehicle roof. In this case, the second element 50 may be arranged facing the rear side of the first element 40 in the vehicle traveling direction. It is because a stable ground is achieved even at the rear side due to the grounding of the rear side of the base plate 10.

Figure 6A:
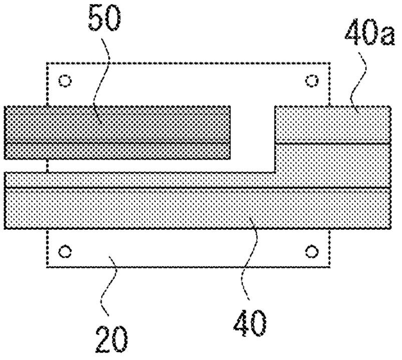
FIGS. 6A and 6B are schematic views for explaining another example of the first element of the low-profile composite antenna device according to the present invention.
Figure 6B:
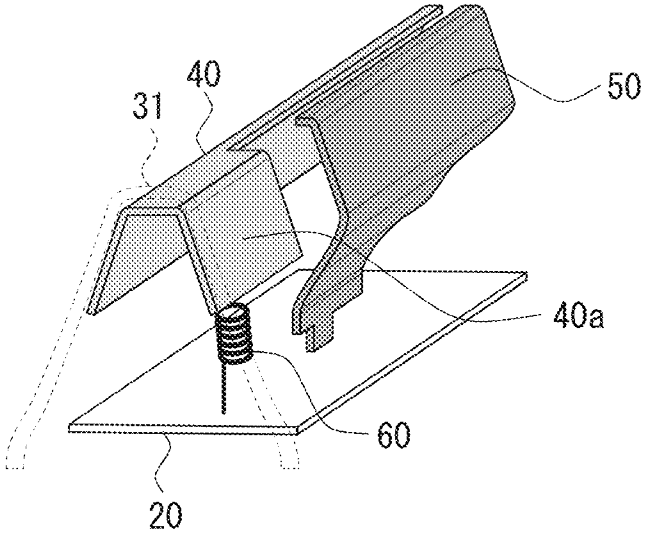

Another example of the first element of the low-profile composite antenna device according to the present invention will be described below. FIGS. 6A and 6B are schematic views for explaining another example of the first element of the low-profile composite antenna device according to the present invention. FIG. 6A is a top view, and FIG. 6B is a perspective view as viewed from the rear side in the vehicle traveling direction. In the drawings, the same reference numerals as those in FIGS. TA to 1C denote the same parts. In the illustrated example, the first and second elements 40 and 50 are mainly illustrated, and other members are omitted. As illustrated, the first element 40 is arranged at one of the left and right sides in the vehicle traveling direction and also partially arranged at the other one thereof. Specifically, the first element 40 is arranged at the left side in the vehicle traveling direction and also partially arranged at the right side in the vehicle traveling direction. That is, as denoted by the reference numeral 40*a*, the first element 40 partially extends toward the right side in the vehicle traveling direction. As illustrated in FIG. 6B, the first element 40 is formed to have a chevron cross sectional shape as viewed from the front side in the vehicle traveling direction such that a part of the first element 40 that is arranged at the left side in the vehicle traveling direction and the part 40*a* arranged at a part of the right side are integrated at the ridgeline part 31 side. In the low-profile composite antenna device according to the present invention, by thus making a part of the first element 40 extend toward the right side, it is possible to further increase the antenna capacity of the first element 40.

As illustrated in FIGS. 6A and 6B, the second element 50 is arranged at the right side in the vehicle traveling direction where the first element 40*a* partially arranged at the right side in the vehicle traveling direction is absent. Thus, it is possible to efficiently arrange the first and second elements 40 and 50 in a narrow space by variously adjusting antenna capacity or element length according to the priority of antenna transmission/reception characteristics thereof.

Further, as illustrated in FIG. 6B, in an example using the coil 60 for the third frequency band, the coil 60 may be arranged below the first element 40 which is integrated with the part 40*a* at the ridgeline part 31 side to have a chevron cross sectional shape as viewed from the front side in the vehicle traveling direction. This reduces the influence that the coil 60 has on the second element 50. The coil 60 may be arranged at any position such as at the front, and center of the first element 40 in the vehicle traveling direction as long as the influence of the coil 60 to the second element 50 can be reduced. In the illustrated example, the coil 60 is vertically arranged such that the axial direction thereof is perpendicular to the longitudinal direction of the first element 40. However, the present invention is not limited to this, but the coil 60 may be arranged such that the coil axis direction thereof is parallel to both the base plate 10 and the longitudinal direction of the first element 40.

The low-profile composite antenna device according to the present invention is not limited to the above examples, but may be variously modified within the scope of the present invention.

REFERENCE SIGNS LIST

10: Base plate
11: Screw boss
20: Circuit board
21: Feeding part for the first element
22: Feeding part for the second element
25: Feed line
30: Antenna cover
31: Ridgeline part
32: Side surface part
40: First element
41: Upper end side
50: Second element
51: Upper end side
60: Coil

The invention claimed is:

1. A low-profile composite antenna device for vehicles, comprising:

a base plate fixed to a vehicle and whose longitudinal direction faces a vehicle traveling direction;

a circuit board arranged on the base plate and having a feeding part for a first element and a feeding part for a second element;

an antenna cover fitted to the base plate, having a ridgeline part whose longitudinal direction faces the vehicle traveling direction and a side surface part extending from both sides of the ridgeline part, and having a chevron cross sectional shape as viewed from a front side in the vehicle traveling direction;

a first element like plate housed in the antenna cover, which is arranged at one of left and right sides in the vehicle traveling direction, which is inclined with respect to the base plate as viewed from the front side in the vehicle traveling direction, whose upper end side is arranged in a vicinity of the ridgeline part, and which is connected to the feeding part for the first element of the circuit board to function as an antenna for a first frequency band; and a second element like plate housed in the antenna cover, which is arranged at the other of the left and right sides in the vehicle traveling direction, whose upper end side is arranged in the vicinity of the ridgeline part with a gap from the first element, which faces the first element from the ridgeline part toward the base plate, and which is connected to the feeding part for the second element of the circuit board to function as an antenna for a second frequency band different from the first frequency band.

2. The low-profile composite antenna device according to claim 1, wherein the first element and the second element are arranged such that at least upper parts thereof are arranged in an inverted V shape as viewed from the front side in the vehicle traveling direction.

3. The low-profile composite antenna device according to claim 1, wherein the first element and/or the second element are arranged such that at least upper parts thereof are along the side surface part of the antenna cover.

4. The low-profile composite antenna device according to claim 1, wherein the second element is bent in an S-like shape as viewed from the front side in the vehicle traveling direction.

5. The low-profile composite antenna device according to claim 1, wherein the first element and/or the second element are bent such that the upper end sides thereof face with each other in the vicinity of the ridgeline part of the antenna cover.

6. The low-profile composite antenna device according to claim 1, wherein the first element is arranged so as to be inclined with respect to the base plate, and the second element is arranged vertically with respect to the base plate.

7. The low-profile composite antenna device according to claim 1, wherein the second element is arranged at a side close to a position where the base plate is fixed to the vehicle at one of front and rear sides in the vehicle traveling direction.

8. The low-profile composite antenna device according to claim 1, wherein the second element is constituted by a bow-tie antenna having a tapered shape tapered from the ridgeline part toward the feeding part for the second element.

9. The low-profile composite antenna device according to claim 1, further comprising a coil connected between the first element and the feeding part for the first element, and adjusted so as to function as a resonance antenna for a third frequency band using a series circuit of the first element and the coil.

10. The low-profile composite antenna device according to claim 1, wherein the first element is arranged at one of the left and right sides in the vehicle traveling direction and also partially arranged at the other of the left and right sides in the vehicle traveling direction.

11. The low-profile composite antenna device according to claim 10, wherein a part of the first element arranged at one of the left and right sides in the vehicle traveling direction and a part of the first element partially arranged at the other of the left and right sides in the vehicle traveling direction are formed to be a chevron shape in a cross-sectional shape as viewed from the front side in the vehicle traveling direction by being integrated at the ridgeline part side.

12. The low-profile composite antenna device according to claim 11, further comprising a coil connected between the first element and the feeding part for the first element, and adjusted so as to function as a resonance antenna for a third frequency band using a series circuit of the first element and the coil, the coil being arranged below the first element which are formed to be a chevron shape in a cross-sectional shape as viewed from the front side in the vehicle traveling direction by being integrated at the ridgeline part side.

13. The low-profile composite antenna device according to claim 10, wherein the second element is arranged at a position where the first element partially arranged at the other of the left and right sides in the vehicle traveling direction is absent.

* * * * *